United States Patent
Lilly, Jr. et al.

[15] 3,657,016
[45] Apr. 18, 1972

[54] SOLID STATE BATTERY HAVING A RARE EARTH FLUORIDE ELECTROLYTE

[72] Inventors: Arnys Clifton Lilly, Jr.; Calvin O. Tiller, both of Richmond, Va.

[73] Assignee: Philip Morris Incorporated, New York, N.Y.

[22] Filed: June 12, 1970

[21] Appl. No.: 45,804

Related U.S. Application Data

[63] Continuation-in-part of Ser. No. 878,287, Nov. 20, 1969.

[52] U.S. Cl. ............................................. 136/83, 136/153
[51] Int. Cl. ..................................................... H01m 11/00
[58] Field of Search ........................... 136/83, 6, 153, 155

[56] References Cited

UNITED STATES PATENTS

| | | | |
|---|---|---|---|
| 2,398,088 | 4/1946 | Ehlers et al. | 106/39 |
| 2,740,928 | 4/1956 | Ward | 317/261 |
| 3,034,924 | 5/1962 | Kraus et al. | 117/106 |
| 3,081,201 | 3/1963 | Koller | 117/217 |
| 3,271,192 | 9/1966 | Thun et al. | 117/217 |
| 3,375,420 | 3/1968 | Sher et al. | 317/258 |
| 3,499,796 | 3/1970 | Hever et al. | 136/83 |
| 3,492,168 | 1/1970 | Root | 136/83 R |
| 3,507,700 | 4/1970 | Fassell et al. | 136/83 R |
| 3,522,101 | 7/1970 | Baker | 136/83 R |
| 3,318,734 | 5/1967 | McCully | 136/83 R |
| 3,186,875 | 6/1965 | Freeman, Jr. | 136/83 R |
| 3,498,843 | 3/1970 | Hunt et al. | 136/83 R |
| 3,506,491 | 4/1970 | Buzzelli | 136/83 R |

FOREIGN PATENTS OR APPLICATIONS

| | | | |
|---|---|---|---|
| 1,034,718 | 6/1966 | Great Britain | 136/153 |
| 1,048,839 | 11/1966 | Great Britain | 136/153 |

*Primary Examiner*—Allen B. Curtis
*Assistant Examiner*—C. F. Lefevour
*Attorney*—Watson, Leavenworth & Kelton

[57] ABSTRACT

A solid state battery comprising an oxygen-impermeable casing containing an electrochemical cell having a cathode, an anode of a material forming stable fluorides and a rare earth fluoride electrolyte. The battery is formed by thin film deposition of the cell elements and is self-limiting as respects output current under load.

11 Claims, 6 Drawing Figures

3,657,016

SOLID STATE BATTERY HAVING A RARE EARTH FLUORIDE ELECTROLYTE

This application is a continuation-in-part of copending application Ser. No. 878,287, filed on Nov. 20, 1969.

FIELD OF THE INVENTION

This invention relates to solid state batteries, and more particularly to self-limiting batteries for low power applications.

BACKGROUND OF THE INVENTION

While the incorporation of solid electrolytes in batteries has enabled the production of improved batteries which are generally non-gassing, rugged in structure, economical, and of minute dimensions, the definition of compatible battery constituents providing desired cell performance characteristics has become substantially more complex than was the case for batteries employing liquid or semi-liquid electrolytes. Thus, extensive present research is directed to definition of anode-cathode-electrolyte material combinations providing operative solid state batteries.

Whereas solid state batteries are limited in respect of power output as compared with aqueous electrolyte batteries, they have found advantageous use in applications requiring relatively low current drain. In certain of such applications, e.g., biomedical current supplying, etc., it is particularly desirable that the solid state battery have the capability of isolating itself from extreme power demands, i.e., transient short circuits, so as not to yield a dangerously high current to its load, and yet have the further capability of providing normal current supply upon completion of the transient demand. While current-limiting circuitry for this purpose is known, the association of same with a supply is both costly and space-consuming.

A solid state battery itself exhibiting such compatibility and current-supplying characteristics is not presently known.

SUMMARY OF THE INVENTION

It is an object of the present invention to provide a solid state battery comprised of elemental components exhibiting compatibility, and adapted to isolate itself from its load circuit during the occurrence of current overdemands.

In the efficient attainment of these and other objects there is provided in the present invention a solid state battery comprised of an oxygen-impermeable casing containing an electrochemical cell comprised of a cathode, an anode spacedly disposed with respect to said cathode and comprised of a metal forming stable fluorides, and a solid rare earth fluoride electrolyte in contacting relation with said anode and said cathode. The anode and cathode are comprised of dissimilar metals displaced from one another within the electromotive series, the anode metal having a work function smaller than the cathode metal.

Batteries are preferably constructed by thin film deposition in accordance with the invention and exhibit an operating characteristic wherein the output voltage existing between the anode and cathode temporarily decreases to zero where external load resistance decreases below a predetermined level.

The foregoing and other features of the invention will be evident from the following detailed description of the invention and of the drawings.

DESCRIPTION OF THE PREFERRED EMBODIMENTS

Figure 1:
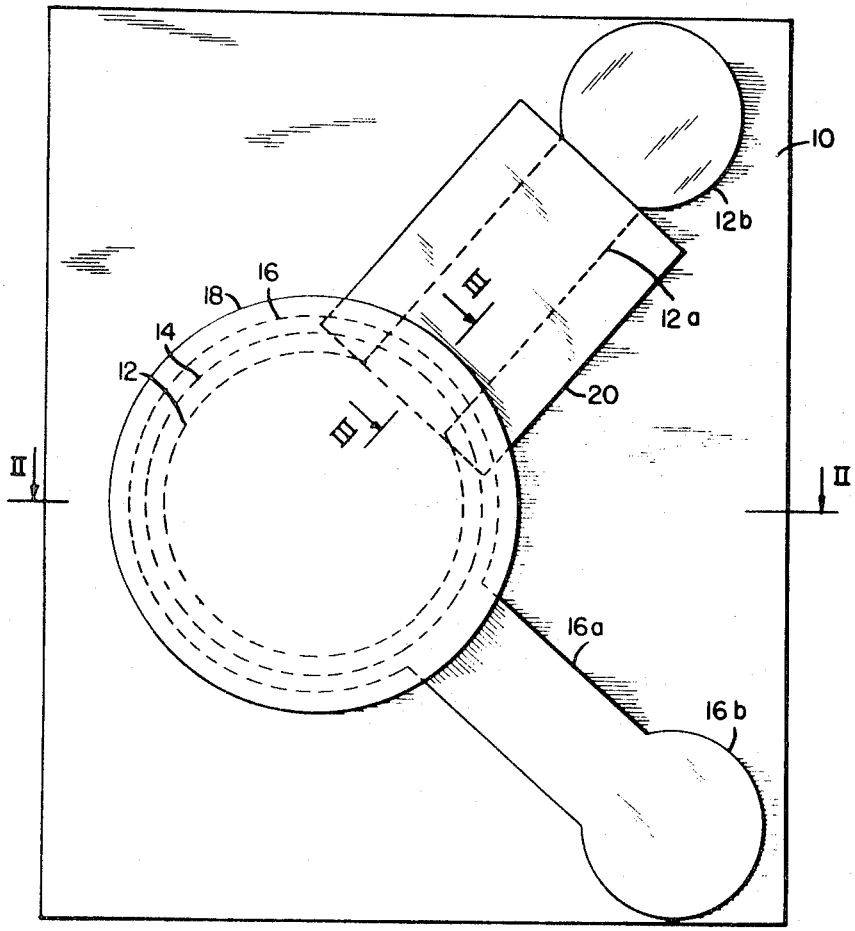
FIG. 1 is a plan view of a preferred embodiment of the battery of the invention.

By way of introduction to the battery of the invention, an embodiment thereof comprising a casing of silicon dioxide containing an electrochemical cell having a bismuth anode, a lanthanum fluoride electrolyte and a gold cathode will be considered in connection with the electrochemical reactions presumed to occur in the cell. A theoretical open circuit voltage of approximately 0.57 volt exists between the bismuth anode and the gold cathode and upon loading, the following reactions are presumed to occur:

In the electrolyte: $[LaF_3] + LaF_3 \rightleftarrows LaF_2^+ + F^-$
At the anode: $Bi + 3F^- \rightleftarrows BiF_3 + 3e^-$  $Bi \rightleftarrows Bi^{+++} + 3e^-$ This lanthanum difluoride cation is substantially immobile, and the gold cathode merely collects electrons. The battery electrode requirements are evidently that the anode form stable fluorides and that the cathode be an inert conductor. Thus, examples of various metals which are usable as battery electrodes include, for the cathode, gold, platinum, rhodium and palladium, and for the anode, silver, zinc, bismuth, beryllium, cadmium, rubidium, lanthanum, iron and lead. Since the battery is responsive to oxygen, as will be presently discussed, it is required that oxygen be evacuated from the anode, cathode and electrolyte upon assembly thereof, or that such assembly be performed in an oxygen-free environment, and that the assembly then be encased in an oxygen-impermeable casing. Usable casing materials include silicon dioxide, tantalum oxide, aluminum oxide and silicon oxide.

The rare earth fluorides, i.e., the fluorides of scandium, yttrium, lanthanum and of the metals of the lanthanide series (atomic numbers 58 through 71), e.g., cerium, praseodymium, neodymium and erbium, are employed as the battery electrolyte.

Underlying the need for the oxygen-impermeable battery casing are the following considerations. The rare earth fluorides exhibit a large density of Schottky defects, i.e., crystalline lattice vacancies created by the removal of an ion from its normal site and placing same on or near the crystal surface. At room temperature, in excess of $10^{19}$ fluorine vacancies per cm.$^3$ are provided, and the vacancies are of sufficient size to provide mobility for the relatively large oxygen anions, if present. Furthermore, the dielectric constants of the rare earth fluorides have been found to accommodate electron capture by oxygen, where an interelectrode potential difference of 0.2 volt and above exists between the anode and cathode contacting the electrolyte. Under such circumstances, the following further reactions are presumed to occur in such unencased oxygenated battery:

At the cathode: $O_2 + e^- \rightarrow O_2^-$ (electron capture)
At the anode: $4Bi + 3O_2^- \rightarrow 2Bi_2O_3 + 3e^-$ Battery output current, desirably dependent exclusively on the electrodes, electrolyte and load resistance, will be seen to be further dependent on ambient oxygen, which is presumed to effectively decrease the internal resistance of the battery. In environments whose oxygen concentration is variable or uncontrolled, spurious change in battery performance characteristics will undesirably result. Whereas oxygen is thus deleterious to consistent battery performance, the presence of water vapor does not affect same to any substantial effect.

Figure 3:
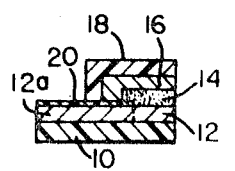
FIG. 3 is a partial sectional view taken along the line III—III of FIG. 1.
Figure 2:
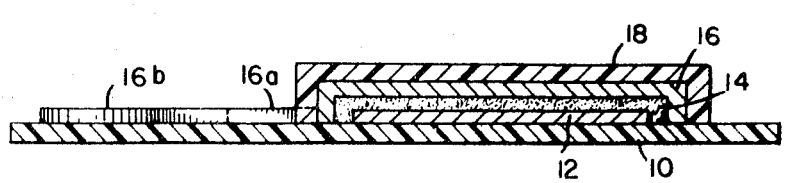
FIG. 2 is a sectional view taken along the line II—II of FIG. 1.

Referring to FIGS. 1, 2, and 3 one structural arrangement of the battery comprises an oxygen-impermeable insulative support member 10, a thin film of anodic metal 12 overlying said support member, a thin film of solid electrolyte 14 overlying said anodic film and said support member, a thin film of cathodic metal 16 overlying said electrolyte and said support member and a thin oxygen-impermeable insulative film 18 overlying said cathodic film and said support member.

In this arrangement cell elements 12, 14, and 16 are substantially circular films concentrically disposed relative to the center of the battery. Film 14 is in contiguous electrical contact with films 12 and 16 and is in separating relation thereto. Thus all conductivity between anodic film 12 and cathodic film 16 occurs through electrolyte film 14. While these films are all in further contacting relation to support member 10, since this member is insulative no inter-film conductivity is provided thereby. The same is true for impermeable film 18 which is electrically insulative.

Anodic film 12 includes a strip portion 12a extending through films 14 and 16 (FIG. 3) to the exterior of the battery, said strip terminating in anode pad 12b by which electrical connection may be made to the anodic film. To preserve battery geometry as respects anode-cathode conductivity through electrolyte film 14, and to prevent direct short-circuiting of films 12 and 16, an insulative layer 20 of oxygen-impermeable material is arranged in overlying relation to anodic film strip portion 12a and support member 10 to enclose strip portion 12a and electrically insulate same from films 14 and 16.

Electrical connection is made to cathodic film 16 through strip portion 16a and pad 16b. As strip portion 16a extends exteriorly of the sensor, same contacts only insulative impermeable film 18 and insulative support member 10. Since no contact is made with underlying enclosed films 12 and 14, no insulative member need be employed in conjunction with strip portion 16a.

In manufacture of the battery illustrated in FIGS. 1–3, the various films are deposited in vacuum through appropriate masks onto support member 10. Typically a glazed alumina sheet, "Alsimag" 614 (American Lava Corp.) one thirty-second inch in thickness with a 743 glaze of borosilicate, is loaded into a vacuum deposition chamber together with evaporation boats each containing material for one of the battery films. The support member is selectively positioned in target positions above the respective material-containing boats by a turntable or carousel. Evaporation masks are supported between the boats and targets on a second carousel which can be raised to bring a mask into contact with the support member. The chamber is evacuated by means of an ion absorption pump to 2.5 to $10^{-8}$ torr and pressure is maintained throughout the deposition process at 2 to 4 times $10^{-7}$ torr. The support member is heated to in excess of 125° C. to remove water and other absorbed contaminants. Thereupon the anodic film evaporation mask is raised against the support member and the anodic film material body is moved into registration with the substrate and mask. The body is then heated with current flow predetermined to give sufficiently rapid deposition, the rate of deposition of each material being selected to insure a smooth and even layer.

Upon completion of deposition of the anodic film, the evaporation boat containing the material constituting insulative film 20 is moved into target position and the evaporated mask corresponding to desired insulative film geometry is raised against the anodic-filmed support member. Thereupon film 20 is deposited over the limited anodic film area illustrated in FIG. 1.

Upon completion of deposition of insulative film 20 upon the support member and anodic film 12, the evaporation boat containing electrolyte film material is moved into the target position and the electrolyte film evaporation mask is raised against the support member in place of the anodic mask and deposition of this film ensues. As particularly illustrated in FIG. 3, the deposited electrolyte film is spaced at a limited portion of the circular periphery thereof from anodic film 12 by insulative layer 20. Substrate temperature is maintained at approximately 125° C. and evaporation is maintained at a relatively slow rate. Such method parameters provide for a reduced number of grain boundaries, low internal electrolyte resistance and avoidance of amorphous electrolyte structure.

Deposition of cathodic film 16 is next performed by movement of the cathodic film material evaporation body and evaporation mask into the target position. As illustrated in FIG. 1, the cathodic film mask defines strip portion 16a and pad 16b in addition to the interior circular cathodic film proper. As illustrated in FIG. 2, the strip pad portions 16a and 16b are deposited directly upon support member 10 whereas all remaining portions of the cathodic film are deposited upon electrolyte film 14 and insulative layer 20 (FIG. 3). Finally the deposition of oxygen-impermeable film 18 is accomplished by movement of appropriate evaporation boat and mask into the target position. This film is deposited over the entire exposed surface of cathode film 16 except for pad 16b and most of strip portion 16a. This film contacts insulative film 20 as is shown in FIG. 3.

As is customary in vacuum deposition of metallic layers onto glass or ceramic substrates it is within the contemplation of the invention to incorporate film underlays providing anchorage for the deposited films. For example, selective deposition of a thin film of chromium on support member 10 and other substrates prior to the above-described deposition steps is within the purview of the invention.

As an alternative arrangement to that illustrated in FIGS. 1–3, the battery anodic and cathodic films may be deposited in spaced coplanar relation on the support member and the electrolyte film deposited on and in the space between the anodic and cathodic films. The oxygen-impermeable insulative film is then deposited over these films and the support member.

Support member 10 and films 18 and 20 may be comprised of the same or different oxygen-impermeable insulative materials.

EXAMPLE 1

A battery having the structure of FIGS. 1–3 is constructed by employing bismuth anodic film material, lanthanum fluoride electrolyte film material and gold cathodic film material. The respective film thicknesses are: 4,320 A., 8,635 A., and 2,015 A.

An open circuit voltage of one-half volt is measured between anodic film pad 12b and cathodic film pad 16b. Upon connection of a load resistance of $1.0 \times 10^9$ ohms to the film pads, an output voltage of 0.15 volt is provided, indicating a load current of $1.5 \times 10^{-10}$ amp. With constant loading for 12 hours, a decrease in output voltage of 0.018 volt occurs.

Figure 4:
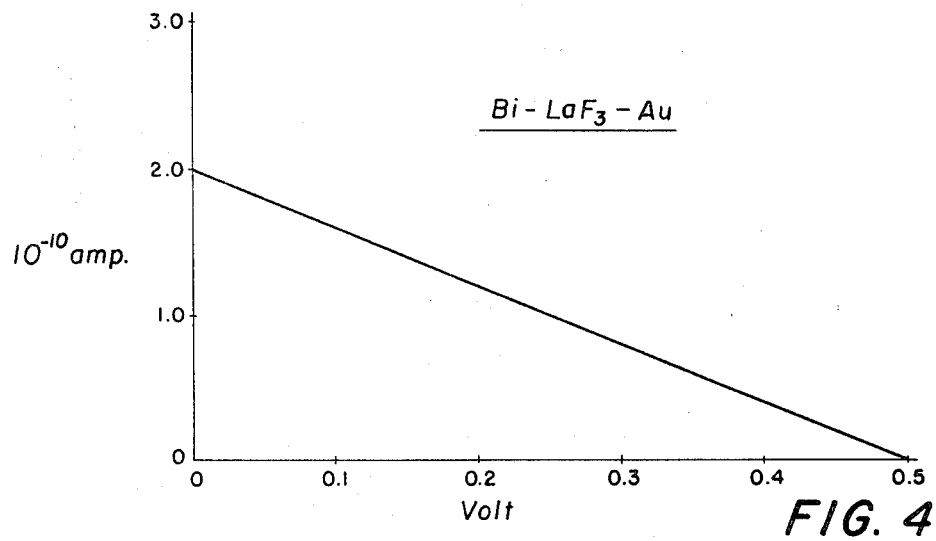
FIGS. 4, 5 and 6 are graphical illustrations of performance characteristics of batteries in accordance with the invention.

These and other performance characteristics of the battery are shown in FIG. 4, wherein the relationship between terminal voltage of the battery and output current is indicated as the load resistance is varied from $10^{10}$ to 0 ohms. From this plot, the effective internal resistance of the battery may be seen to be approximately $2.5 \times 10^9$ ohms, and it will be noted that the battery is self-limiting as respects maximum allowable output current. Thus, at an output current of about $2.0 \times 10^{-10}$ amp., output voltage falls to zero. Such self-limiting characteristic is of particular importance in applications within the purview of the invention, i.e., biomedical electronics, wherein it may be desired to have a battery which is adapted to discontinue current supplying above a predetermined maximum current level without the need for current regulating apparatus.

EXAMPLE 2

A battery having the structure of FIGS. 1–3 is constructed by employing bismuth anodic film material, praseodymium fluoride electrolyte film material and gold cathodic film material. The respective film thicknesses are: 3,174 A., 2,744 A., and 804 A.

An open circuit voltage of one-half volt is measured between anodic film pad 12b and cathodic film pad 16b. Upon connection of a load resistance of $1.0 \times 10^9$ ohms to the film pads, an output voltage of 0.25 volt is provided, indicating a load current of $2.5 \times 10^{-10}$ amp. With constant loading for 12 hours, a decrease in output voltage of 0.027 volt occurs.

Figure 5:
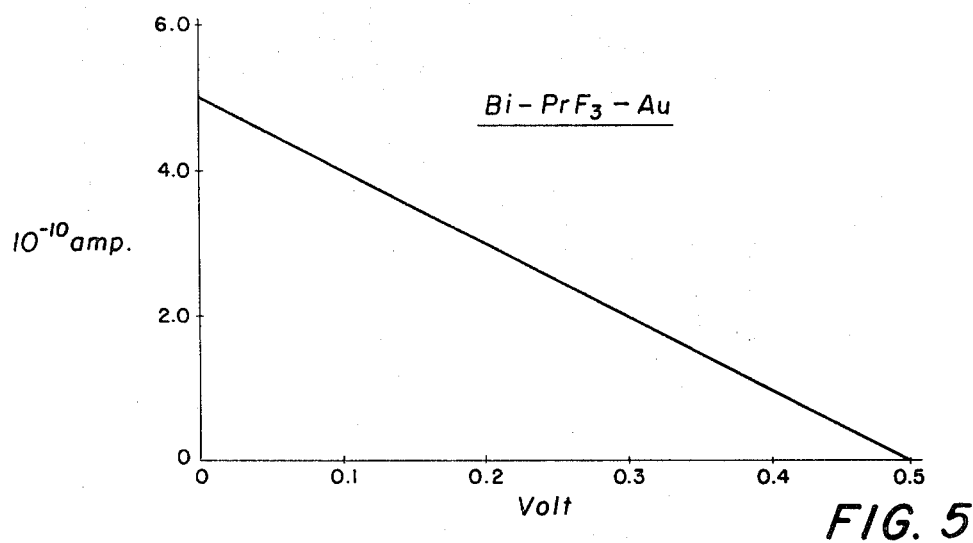

These and other performance characteristics of the battery are shown in FIG. 5, wherein the relationship between terminal voltage of the battery and output current is indicated as the load resistance is varied from $10^{10}$ to 0 ohms. From this plot, the effective internal resistance of the battery may be seen to be approximately $1.1 \times 10^9$ ohms, and it will be noted that the battery is self-limiting as respects maximum allowable output current. Thus, at an output current of about $5.0 \times 10^{-10}$ amp., output voltage falls to zero.

EXAMPLE 3

A battery having the structure of FIGS. 1-3 is constructed by employing bismuth anodic film material, neodymium fluoride electrolyte film material and gold cathodic film material. The respective film thicknesses are: 2,200 A., 2,598 A., and 878 A.

An open circuit of one-half volt is measured between anodic film pad 12b and cathodic film pad 16b. Upon connection of a load resistance of $1.0 \times 10^9$ ohms to the film pads, an output voltage of 0.27 volt is provided, indicating a load current of $2.7 \times 10^{-10}$ amp. With constant loading for 12 hours, a decrease in output voltage of 0.015 volt occurs.

Figure 6:
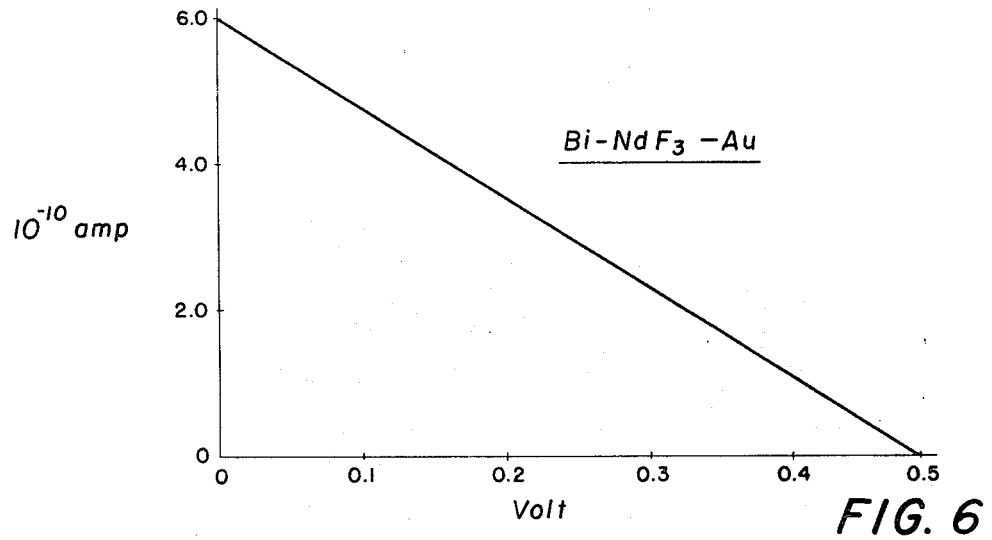

These and other performance characteristics of the battery are shown in FIG. 6, wherein the relationship between terminal voltage of the battery and output current is indicated as the load resistance is varied from $10^{10}$ to 0 ohms. From this plot, the effective internal resistance of the battery may be seen to be approximately $1.0 \times 10^9$ ohms, and it will be noted that the battery is self-limiting as respects maximum allowable output current. Thus, at an output current of about $6.0 \times 10^{-10}$ amp., output voltage falls to zero.

While the invention has been disclosed by way of the foregoing particularly preferred embodiments, various modifications thereto will be evident to those skilled in the art and thus such embodiments are intended in a descriptive and not in a limiting sense. The spirit and scope of the invention will be evident from the following claims.

What is claimed is:

1. A solid state battery comprising an oxygen-impermeable casing containing an electrochemical cell having a metallic cathode comprised of an inert conductor, a metallic anode spacedly disposed with respect to said cathode, said anode forming stable fluorides, and a solid rare earth fluoride electrolyte in contacting relation with said anode and said cathode, said anode metal having a work function smaller than that of said cathode metal and being of a dissimilar metal than that of such cathode.

2. The battery claimed in claim 1 wherein said electrolyte is lanthanum fluoride.

3. The battery claimed in claim 1 wherein said electrolyte is praseodymium fluoride.

4. The battery claimed in claim 1 wherein said electrolyte is neodymium fluoride.

5. The battery claimed in claim 2 wherein said anode is bismuth and said cathode is gold.

6. The battery claimed in claim 3 wherein said anode is bismuth and said cathode is gold.

7. The battery claimed in claim 4 wherein said anode is bismuth and said cathode is gold.

8. The battery claimed in claim 1 wherein said casing is comprised of a material selected from the group consisting of silicon dioxide, tantalum oxide, aluminum oxide and silicon oxide, or a combination thereof.

9. The battery in claim 1 wherein first and second cooperating oxygen-impermeable insulative members define said casing, said first casing member in contacting relation with a first surface of said cathode, said second casing member in contacting relation with a first surface of said anode, said electrolyte interposed between said cathode and said anode and in contacting relation with another surface of said cathode and of said anode.

10. The battery in claim 9 wherein said anode, cathode, electrolyte and first casing member are thin films, said anodic and cathodic films including portions extending through and exteriorly of said first casing member.

11. The battery claimed in claim 10 further including an oxygen-impermeable insulative film in contacting relation with and partially overlying said anodic film and insulating said anodic film portion from said cathodic film.

* * * * *